(12) United States Patent
Ashley et al.

(10) Patent No.: US 8,480,888 B2
(45) Date of Patent: Jul. 9, 2013

(54) IMMEDIATE CLEANING AND RECIRCULATION OF CLEANING FLUID AND METHOD OF USING SAME

(75) Inventors: Dennis Ashley, Gresham, OR (US); Ben Checketts, Vancouver, WA (US); Shannon L. Taylor, Vancouver, WA (US); Bernie L. Larson, Vancouver, WA (US); Richard W. Frederick, Vancouver, WA (US); Paul W. Linton, Camas, WA (US)

(73) Assignee: Karcher North America, Inc., Englewood, CO (US)

( * ) Notice: Subject to any disclaimer, the term of this patent is extended or adjusted under 35 U.S.C. 154(b) by 625 days.

(21) Appl. No.: 12/480,515

(22) Filed: Jun. 8, 2009

(65) Prior Publication Data
US 2010/0307984 A1 Dec. 9, 2010

(51) Int. Cl.
  *C02F 1/52* (2006.01)
  *C02F 1/463* (2006.01)
  *C02F 1/56* (2006.01)
  *C02F 9/02* (2006.01)
  *C02F 9/04* (2006.01)
  *C02F 9/06* (2006.01)

(52) U.S. Cl.
  USPC ............ 210/195.1; 210/167.01; 210/167.3; 210/167.31; 210/199; 210/202; 210/205; 210/206; 210/122; 210/400

(58) Field of Classification Search
  USPC ............ 210/195.1, 167.01, 167.3, 167.31, 210/199, 202, 205, 206, 122, 400
  See application file for complete search history.

(56) References Cited

U.S. PATENT DOCUMENTS

| 1,602,105 A | 10/1926 | Geer et al. |
| 2,765,997 A | 10/1956 | Motts |

(Continued)

FOREIGN PATENT DOCUMENTS

| CA | 2298122 | 7/2001 |
| CA | 2584947 A1 * | 9/2008 |

(Continued)

OTHER PUBLICATIONS

"Washwater treatment ElectroPulse Technology", Oil Trap Inc., Recycling Product News, Jul.-Aug. 2005, p. 1.

(Continued)

*Primary Examiner* — Thomas M Lithgow
(74) *Attorney, Agent, or Firm* — Sheridan Ross P.C.

(57) ABSTRACT

A system and process for continuously and immediately removing contaminants from wastewater and treating wastewater, where the wastewater is treated to supply fluid that can be reused in the cleaning system or discharged safely into the environment is disclosed. The system and method comprises one or more pumping means for circulating and recirculating fluids captured or collected by the system to one or more of the processes in the system, such as wash water applications or further treatment cycles. According to one embodiment, the wastewater is transported through purification sections of the device. Depending on the system used, these sections could include several of the following: pretreatment to remove debris and certain heavy solids; treatment by methods such as a conductivity solution injection system and/or electrolytic coagulation system, a polymer injection system, and a inline mixer for mixing the polymer in the wastewater stream; and an ozone treatment system. In a preferred embodiment, each of the treatment sections are contained within an enclosure cabinet that includes a controller and feed containers for conductivity fluid and polymers.

8 Claims, 13 Drawing Sheets

U.S. PATENT DOCUMENTS

| | | | |
|---|---|---|---|
| 3,064,486 A | | 11/1962 | Aplin |
| 3,652,044 A | | 3/1972 | Manross |
| 3,810,544 A | * | 5/1974 | Armstrong et al. ......... 210/167.31 |
| 3,831,849 A | | 8/1974 | Studinger |
| 3,834,657 A | | 9/1974 | Freitas, Jr. |
| 3,858,761 A | | 1/1975 | O'Dell |
| 3,908,941 A | | 9/1975 | Bromley et al. |
| 3,923,658 A | | 12/1975 | Lancaster |
| 4,104,164 A | * | 8/1978 | Chelton .................. 210/136 |
| 4,120,210 A | | 10/1978 | Sloyan |
| 4,246,982 A | | 1/1981 | Pretnick |
| 4,306,967 A | | 12/1981 | Trautwein |
| D263,037 S | | 2/1982 | Brown |
| 4,355,834 A | | 10/1982 | Alford |
| 4,367,145 A | | 1/1983 | Simpson et al. |
| 4,431,548 A | | 2/1984 | Lipowski et al. |
| D276,902 S | | 12/1984 | Plugge |
| 4,561,624 A | | 12/1985 | Freeman |
| 4,652,368 A | | 3/1987 | Ennis et al. |
| 4,792,274 A | | 12/1988 | Cockram |
| 5,031,602 A | | 7/1991 | Vick |
| D329,996 S | | 10/1992 | Ciszewski |
| 5,286,302 A | | 2/1994 | Wickham, III |
| 5,413,128 A | | 5/1995 | Butts |
| 5,445,730 A | | 8/1995 | Pattee |
| 5,498,329 A | | 3/1996 | Lamminen et al. |
| 5,601,659 A | | 2/1997 | Rohrbacher |
| 5,611,487 A | | 3/1997 | Hood |
| 5,695,121 A | | 12/1997 | Stillions, Jr. et al. |
| 5,746,904 A | | 5/1998 | Lee |
| 5,833,295 A | | 11/1998 | Farlow, Jr. |
| 5,908,550 A | | 6/1999 | Kaipainen |
| 5,958,240 A | | 9/1999 | Hoel |
| 5,975,480 A | | 11/1999 | Schaefer et al. |
| 6,021,792 A | * | 2/2000 | Petter et al. .................. 134/111 |
| 6,042,702 A | | 3/2000 | Kolouch et al. |
| 6,106,712 A | | 8/2000 | New |
| 6,132,509 A | | 10/2000 | Kuschnereit |
| 6,132,599 A | | 10/2000 | Chaffee |
| 6,234,408 B1 | | 5/2001 | Stevens et al. |
| 6,234,409 B1 | | 5/2001 | Aslakson |
| 6,301,848 B1 | | 10/2001 | Whitaker |
| 6,346,197 B1 | | 2/2002 | Stephenson et al. |
| 6,349,715 B1 | | 2/2002 | McBroom |
| 6,416,101 B1 | | 7/2002 | Bartch |
| 6,495,048 B2 | | 12/2002 | Stephenson et al. |
| 6,550,692 B1 | | 4/2003 | Schacht |
| 6,575,858 B2 | | 6/2003 | Green et al. |
| 6,641,721 B2 | | 11/2003 | Mulierheim |
| 6,655,396 B2 | | 12/2003 | Krenzel |
| 6,663,783 B2 | | 12/2003 | Stephenson et al. |
| 6,715,517 B2 | | 4/2004 | Tobin |
| 6,766,822 B2 | | 7/2004 | Walker |
| 6,790,349 B1 | | 9/2004 | Sawyer |
| 6,799,591 B2 | | 10/2004 | McCormick et al. |
| 6,932,412 B1 | | 8/2005 | Paproski |
| D510,545 S | | 10/2005 | Riegel et al. |
| 6,964,820 B2 | | 11/2005 | Shimonosono et al. |
| 7,066,096 B1 | | 6/2006 | Harker et al. |
| 7,118,633 B2 | | 10/2006 | Jenkins |
| 7,121,288 B2 | | 10/2006 | Jenkins |
| 7,160,472 B2 | | 1/2007 | Van Vliet et al. |
| 7,203,979 B2 | | 4/2007 | O'Brien |
| 7,258,749 B2 | | 8/2007 | McCormick et al. |
| D555,303 S | | 11/2007 | Taylor et al. |
| D566,624 S | | 4/2008 | Dempsey et al. |
| D572,212 S | | 7/2008 | Taylor et al. |
| 7,431,835 B2 | | 10/2008 | Lack |
| 7,530,362 B2 | | 5/2009 | McCormick et al. |
| 7,775,221 B2 | | 8/2010 | Zeile |
| D626,461 S | | 11/2010 | Barrios et al. |
| 7,943,040 B2 | * | 5/2011 | Taylor et al. ............... 210/167.3 |
| 2006/0118149 A1 | | 6/2006 | Benson et al. |
| 2006/0273622 A1 | | 12/2006 | Laird |
| 2007/0056510 A1 | | 3/2007 | Antaya |
| 2007/0199868 A1 | * | 8/2007 | Volpe ......................... 210/143 |
| 2008/0000507 A1 | | 1/2008 | Snyder et al. |
| 2009/0062046 A1 | | 3/2009 | Lindemann |
| 2009/0065442 A1 | | 3/2009 | Taylor et al. |
| 2009/0188535 A1 | | 7/2009 | Taylor et al. |
| 2011/0232696 A1 | | 9/2011 | Barrios et al. |
| 2011/0253179 A1 | | 10/2011 | Barrios et al. |

FOREIGN PATENT DOCUMENTS

| | | | |
|---|---|---|---|
| JP | 59-069189 A | * | 4/1984 |
| JP | 10-297440 A | * | 11/1998 |
| JP | 2004-066037 A | * | 3/2004 |
| WO | WO 2006/060856 A2 | * | 6/2006 |

OTHER PUBLICATIONS

"Danron Enterprises Electro-Coagulation Treatment (ECT) System Performance Claim", Environmental Technology Verification (ETV) Program website, as early as Mar. 2006, available at http://www,etvcanada.ca/F/data/PDF_Danron.pdf, pp. 1-2, printed on Apr. 6, 2007.

Diterlizzi, "Introduction to Coagulation and Flocculation of Wastewater", Term Project/Environmental Systems Project, Fall 1994, available at http://www.rpi.edu/dept/chem-eng/Biotech-Environ/COAG/coag.htm, pp. 1-4, printed on Apr. 6, 2007.

"Hydropad Portable Wash Pad: Hydropads have the following features:", ecosentry website, as early as 2005, available at http://www.ecosentry.com.au/hydropad, pp. 1-3, printed on Aug. 10, 2006.

"Hydropad Portable Wash Pad", HE HYDROengineering website, as early as 2004, available at http://www.hydroblaster.com/HydropadPortableWashRack.html, pp. 1-11, printed on Aug. 10, 2006.

"Applications: The Drive-On Wash Pad-design your own wash pad", EZ Environmental Solutions Corporation website, date unknown, available at, http://www.ezenvironmental.com/product.asp-?page=1224, pp. 1-3, printed on Aug. 10, 2006.

"Cyclonator: Pumping & Polution Control Solutions", Megator website, as early as Dec. 12, 2004, available at http://www.megator.com/cyclonator.htm, pp. 1-2, printed on Aug. 10, 2006.

Official Action for Canadian Patent Application No. 2,674,353, dated Mar. 8, 2011.

Official Action for Canada Patent Application No. 2,674,353, mailed Jan. 31, 2012 2 pages.

* cited by examiner

IMMEDIATE CLEANING AND RECIRCULATION OF CLEANING FLUID AND METHOD OF USING SAME

FIELD OF THE INVENTION

The field of the present disclosure is directed to wash fluid containment and fluid treatment systems. More particularly the present disclosure is directed to a method and system for treating and then recirculating cleaning fluids used in various cleaning environments, including immediate cleaning and circulation of fluids recovered by the system after their initial use in cleaning an object.

BACKGROUND OF THE INVENTION

In certain environments it is desirable to contain wastewater fluids from washing activities and to treat those fluids for recycling and reuse and/or to recirculate those fluids throughout the cleaning system. For example, see U.S. patent application Ser. No. 12/032,562 filed on Feb. 15, 2008 and U.S. Patent Publication No. 2009-0065442-A1, both of which are incorporated by reference herein in their entireties. There are systems and methods known in the prior art for treating water and for recirculating water collected or used by those systems for use in cleaning. However, these systems delay treatment of spent fluid and are inefficient in treating and recycling the wastewater and/or greywater. These delays and inefficiencies contribute to hazards and/or unpleasant working conditions.

These prior art systems specifically experience problems as a result of their failure to provide immediate and efficient fluid treatment, including but not limited to odors caused by the standing or untreated fluids, increased sedimentation caused by the standing fluid, increased storage capacity requirements to hold the standing fluid, and increased need for fresh or unused fluid to continue the task of cleaning for which the overall system was designed. These prior art systems also require larger footprints than are needed with the devices of the present disclosure. The prior art systems also facilitate evaporative loss of fluid due to the use of open standing basins or from other losses (such as losses due to lack of capacity for holding additional quantities of used fluids prior to or following treatment of those fluids) none of which occurs in the device of the present disclosure.

SUMMARY OF THE INVENTION

According to varying embodiments of the present disclosure, a wash fluid and waste fluid treatment system is disclosed. The system comprises a method for immediately circulating one or more spent fluids to a treatment apparatus of the system. From there, these treated fluids may be deposited into a holding tank for use in a cleaning process or into a waste holding tank for future disposal. The system in varying embodiments comprises one or more pumps for flushing varying degrees of dirty water from the system, recirculating one or more cleaning fluids to varying parts of the system, and further facilitates the transfer and use of reclaimed spent fluid for either further treatment or subsequent appropriate use throughout the system. According to at least one embodiment, the fluids that are collected and recirculated are used for processes other than those of the system from which the fluids are collected. Also, a description of pump and recirculation systems and methods known in the art and suitable for use with these disclosed inventions are disclosed in U.S. Pat. Nos. 6,964,820, 6,766,822, 6,715,517, 6,132,599 and 4,306,967 which are all incorporated by reference herein in their entireties.

The system and process described herein thus provides a method for continuously and immediately removing contaminants from spent cleaning fluid and treating that waste fluid. That treated fluid may not be reused in the cleaning system or safely discharged into the environment, including storm sewer systems or potable water supply systems. According to another embodiment, the waste fluid is transported through a purification apparatus associated with the overall device. Depending on the precise system configuration, these apparatuses could include one, several or all of the following subsystems: pre-treatment system to remove debris and certain heavy solids; treatment by methods and systems such as a conductivity solution injection system and/or electrolytic coagulation system, a polymer injection system, and a inline mixer for mixing the polymer in the wastewater stream; and an ozone or other oxidizing gas injection treatment system. In one other embodiment, each of the treatment sections of the overall device are contained within an enclosure cabinet that includes a controller and/or control panels, as well as, feed containers to hold the conductivity fluid, polymer, oxidizing gasses, etc.

Thus, according to one embodiment of the present disclosure, a self contained cleaning apparatus for continuously treating wastewater is disclosed, comprising:

at least one inlet for collecting fluids expelled by a cleaning device in cleaning an of the cleaning apparatus;

at least one separation apparatus for separating solid contaminants from the fluids received by the at least one inlet;

a pump for transferring the fluids to a fluid treatment system;

transferring the fluids from the fluid treatment system to a clean fluid retention device;

wherein the inlet for collecting fluids captures substantially the entire volume of fluids expelled by the cleaning device with the apparatus continuously transferring these fluids from the inlet, through the at least one separation apparatus, to the fluid treatment system and then to the clean fluid retention device.

According to yet another embodiment of the present disclosure, a method for continuously removing contaminants from a wastewater stream is disclosed, comprising:

(a) substantially continuously collecting wastewater produced from a washwater application;

(b) separating solid contaminants from the wastewater by at least one filtering apparatus;

(c) providing an electrochemical cell comprising at least a pair of conductive plates stacked in parallel spaced relation, wherein electricity is passed into the conductive plates and through the wastewater stream to produce a coagulated stream;

(d) injecting at least one coagulating reagent into the coagulated stream from the electrochemical cell and passing the coagulated stream to a mixer, wherein the mixer contacts precipitated solids present in the coagulated stream with the coagulating reagent to produce a reagent-mixed liquid;

(e) passing the reagent-mixed liquid from the mixer past a vent and into a flotation cell where a flotation cell liquid is produced through the removal of a majority of a coagulated particles from the reagent-mixed liquid; and (f) passing the flotation cell liquid from the flotation cell to a settling tank where a substantially solid-free liquid is produced and transferred to holding device.

According to yet another embodiment of the present disclosure, a system for fluid treatment and recirculation is disclosed, comprising:

substantially continuously collecting wastewater produced by the system;

a first, second and third fluid treatment compartment disposed in a single cabinet enclosure, the first fluid treatment compartment being connected to an outlet of a solid contaminants separation system, the inlet of the second fluid treatment compartment being connected to an outlet of the first fluid treatment compartment, and the inlet of the third fluid treatment compartment being connected to an outlet of the second fluid treatment compartment;

substantially continuously transferring collected wastewater to at least one of the first, second and third fluid treatment compartments;

wherein the first, second and third fluid treatment compartments consecutively separate particulates from the fluid as the fluid travels through the fluid treatment system; and wherein the first, second and third water treatment compartments are each operably associated with at least one pump for distributing fluid to either:

(a) the first, second or third fluid treatment compartments;

(b) the solid contaminants separation system; or (c) a holding device.

These and other features of the present disclosure will become apparent after a review of the following detailed description of the preferred embodiments, the accompanying drawing figures and the appended claims.

Figure 1:
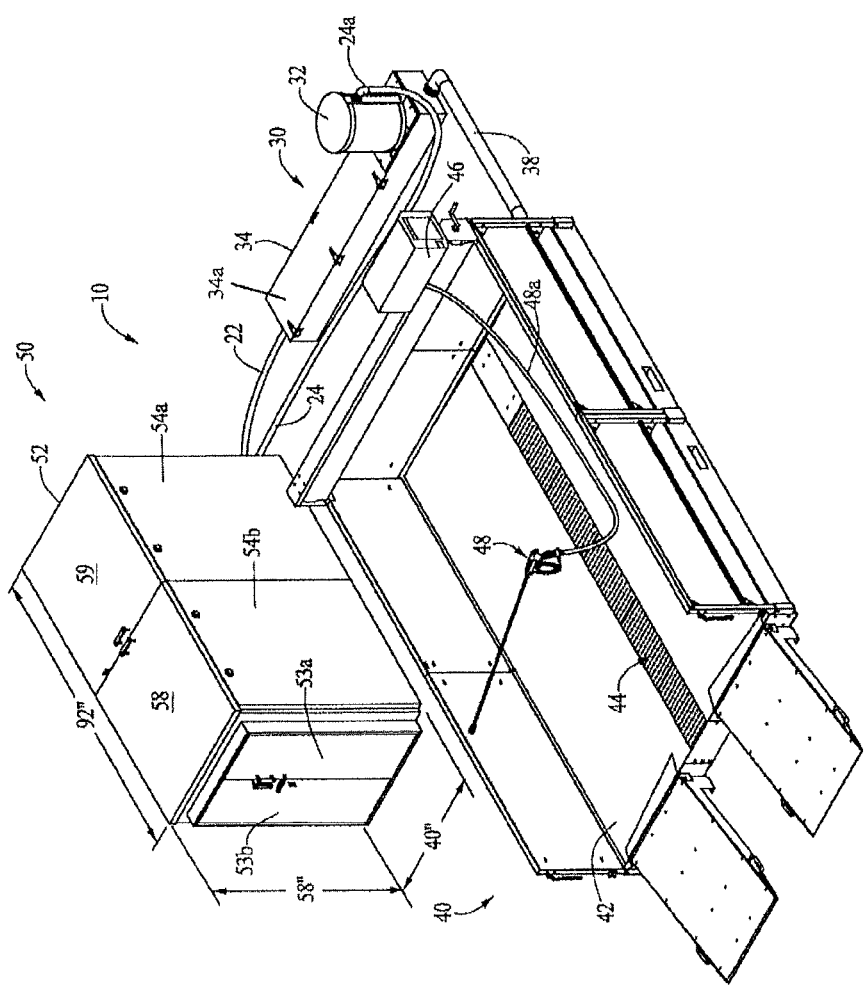
FIG. 1 is a front top perspective view of a wash fluid containment and treatment system according to a preferred embodiment.

The drawing figures are not necessarily drawn to scale.

DETAILED DESCRIPTION

Varying embodiments of the present disclosure are described herein with reference to the drawings. It is expressly understood that although FIGS. 1-6 depict a washwater treatment system, comprising a wash pad suited for washing a vehicle, similar type of equipment or other objects, other sources of wash fluid and/or waste fluid are contemplated for use with the system of the present disclosure. For example, sources of wash fluid other than the fluid collected from the wash pad shown in FIGS. 1-6, could be used with the disclosed system. These sources of fluid could include, by way of example but not limitation, wash fluid collection apparatus, rain water collection apparatus, grey fluid collection apparatus, waste fluid collection apparatus, runoff water collection apparatus, potable water collection apparatus, sewer water collection apparatus, and waste fluid treatment apparatus. Thus, for purposes of the present disclosure, it is contemplated that several varying types of wash fluid or waste fluid (or varying degrees of "dirty" fluid) may be employed without departing from the spirit of the invention, as described in the appended claims. It also will be understood that in this disclosure, the terms "water" and "fluid" are interchangeable and "water" may include more than $H_2O$ and "fluid" may by simply $H_2O$, but neither case is required by the devices disclosed herein. Furthermore, the collected and recirculated fluids may be used for one or more discrete purposes other than those disclosed in connection with the device of the present disclosure.

FIGS. 1-4 illustrate a combined system 10 for a washwater containment and water treatment system according to a preferred embodiment. The combined system 10 includes a wash pad 40, a sump 30, and a water treatment system 50. A vehicle, other piece of equipment or object to be washed may be moved or driven onto the wash pad 40. As the equipment is washed via the pressure washer 48, wastewater is directed inwardly by the sloped surfaces of the wash pad sections 42, collected via central trench 44, and then transferred via a hose or pipe 38 to the sump 30.

The sump 30 comprises a sludge tank/separator 32 and a trench section 34 including a weir 35. The wastewater entering the trench section 34 from the pipe 38 must pass over the weir 35 in the trench section 34 and thereafter enters the treatment system 50 via hose 22. The trench section 34 of the sump 30 has a hinged cover 34a that may be pivoted open to provide access to inside of the trench section 34, enabling removal of debris/solids collected by the weir. Recycled/treated water from the system 50 may be stored for future use, properly disposed of or immediately recirculated to the cleaning wand 48 via line 92. Sludge waste from the treatment system 50 is purged into the tank 32 via hose 24. The tank 32 filters/separates the sludge waste from the water, the water passing through and into the sump trench 34. The sludge waste may be manually removed from the tank 32.

The water treatment system 50 includes an enclosure or cabinet 52 that houses/encloses various system components. The cabinet 52 is drawn generally to scale to itself, but at a slightly enlarged scale relative to the wash pad. The size dimensions for the cabinet 52 are illustrated in FIG. 1, namely 92 inches (230 cm) long by 40 inches (100 cm) wide by 58 inches (150 cm) high. These dimensions constitute a preferred size of cabinet. The cabinet 52 includes: removable upper doors 58, 59; removable side panels 54a, 54b (two side panels on each lateral side); hinged front doors 53a, 53b; and removable rear panel. The water treatment system 50 and cabinet 52 enclosing the system are sized to be movable, such as by a forklift, the system having a capacity for treating wastewater from a wash pad sized for washing vehicles such as automobiles, pickups, various rental equipment and other objects.

Figure 2:
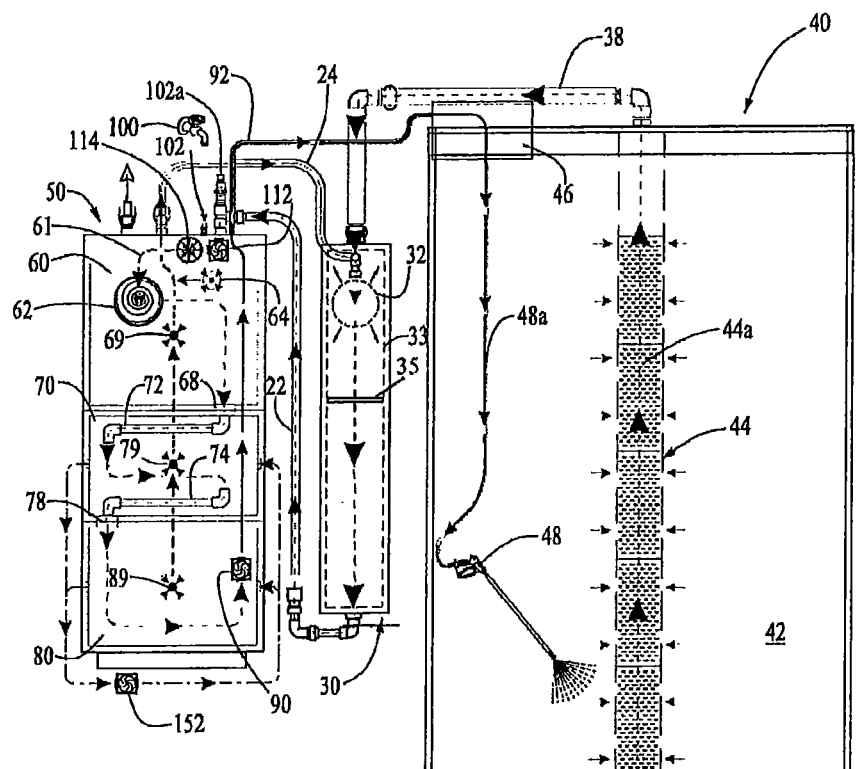
FIG. 2 is a process diagram of the wash fluid containment and fluid treatment system of FIG. 1.
Figures 3, 3A:
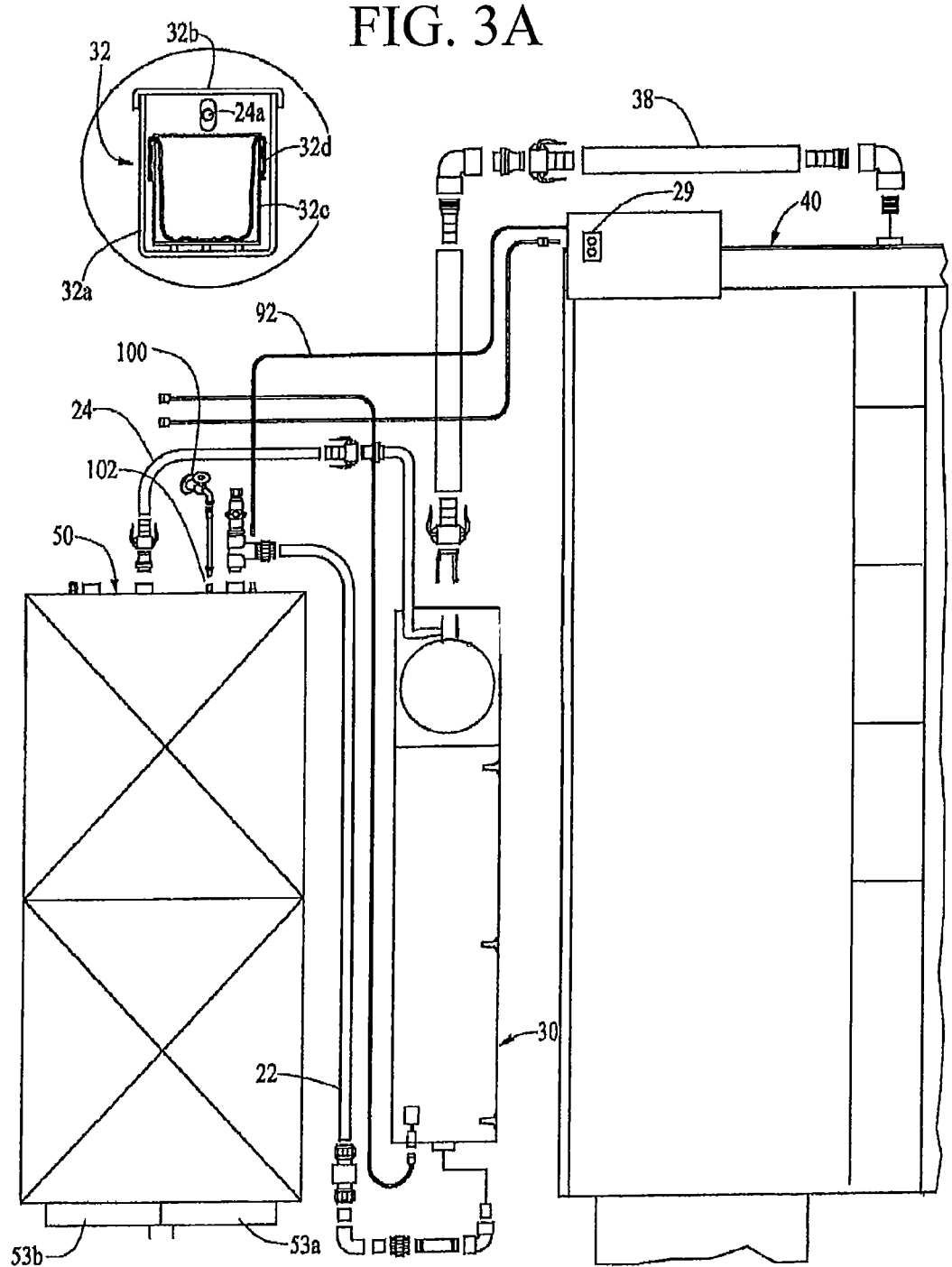
FIG. 3 is a top plan view of the wash fluid containment and treatment system of FIG. 1 with the sump section positioned along a lateral side of the wash pad.
FIG. 3A is a detailed view of the sludge separator of the system of FIG. 1.

Further details of the wash pad 40 are described in U.S. patent application Ser. No. 12/032,562 filed Feb. 15, 2008 hereby incorporated by reference. In a preferred configuration, the trench 44 is reversible. Depending on the orientation of the trench 44, wastewater may be drained either forwardly or rearwardly for connection to the sump hose 38. FIGS. 1-3 illustrates the trench 44 oriented for drainage in the rearward direction connected by the pipe 38 to the sump 30.

The wash pad assembly 40 may also include an integrated pressure washer system comprised of a hose reel and housing assembly 46 and pressure washer assembly 48. The pressure washer assembly 48 includes a trigger valve mechanism, a wand and nozzle attached to a fluid source preferably by a hose 48a. The hose 48a may be wound onto a hose reel that is disposed within the hose reel housing 46. The hose reel housing 46 may be located either on the right side of the wash pad (as shown in FIG. 1) or on the left side (as shown in FIGS. 2-3) or other suitable location.

A grating 44a is installed over the trench 44 between the left and right wash pad sections 42. The grating 44a has perforations for allowing the water flowing downward from the wash pad sections 42 to pass there through and into the trench 44. The perforations are preferably of a desired size, typically large enough to allow for the passage of fluid and entrapped dirt, gravel, etc. into trench 44, but small enough to prevent passage of larger size debris to enter the trench. Such larger debris may then be removed from the pad by sweeping or other collection process. Under the grating 44a, the trench 44 includes two weirs and a screen (not shown) disposed near the exit end of the trench 44 such that water must pass over the weirs and through the screen whereby some debris and heavy solids are inhibited from reaching the exit pipe 38.

According to one embodiment, the wastewater from the trench 44 then passes via pipe 38 to the sump 30. The sump 30 comprises a sludge separator 32 and a holding tank 33 including a weir (not shown). The wastewater from pipe 38 preferably passes over the weir in the holding tank 33, the weir capturing certain debris and heavy solids, and the wastewater thereafter is transferred to the treatment system 50 via hose 22. As described in greater detail below, recycled/treated water from the treatment system 50 may be immediately returned to the wash pad area for use by the pressure washer assembly 48, or may be recirculated through the treatment system. Sludge waste from the treatment system 50 is purged into the sludge separator 32 via hose 24 through fitting 24a. The sludge separator 32 includes an outer tank 32a with a top lid 32b. Inside the tank 32a may be a bucket-shaped filter screen 32c that filters/separates the sludge waste and other particulates from the water, the water passing through the filter and into the holding tank 33. A fabric filter 32d may be disposed in the filter screen 32c to provide enhanced particle removal. The sludge waste (which may be referred to as solids) may be manually removed from both the holding tank 33 and the filter screen 32c. The fabric filter 32d is typically a disposable element.

Thus, according to the embodiment shown in FIGS. 1-3, even before reaching the water treatment system 50, the wastewater has undergone at least three processes for removing debris and solids, namely: (a) grating 44a, (b) the trench 44 (via the weirs and screen) and (c) the sump 30. A pumping apparatus of known configuration (not shown in FIGS. 1-3) may also be provided to recirculate the collected wastewater through these at least three and subsequent processes, may be sent immediately to the wash pad for reuse as washwater without further treatment or may be sent to a holding tank, or may be sent to another appropriate system.

Figure 4:
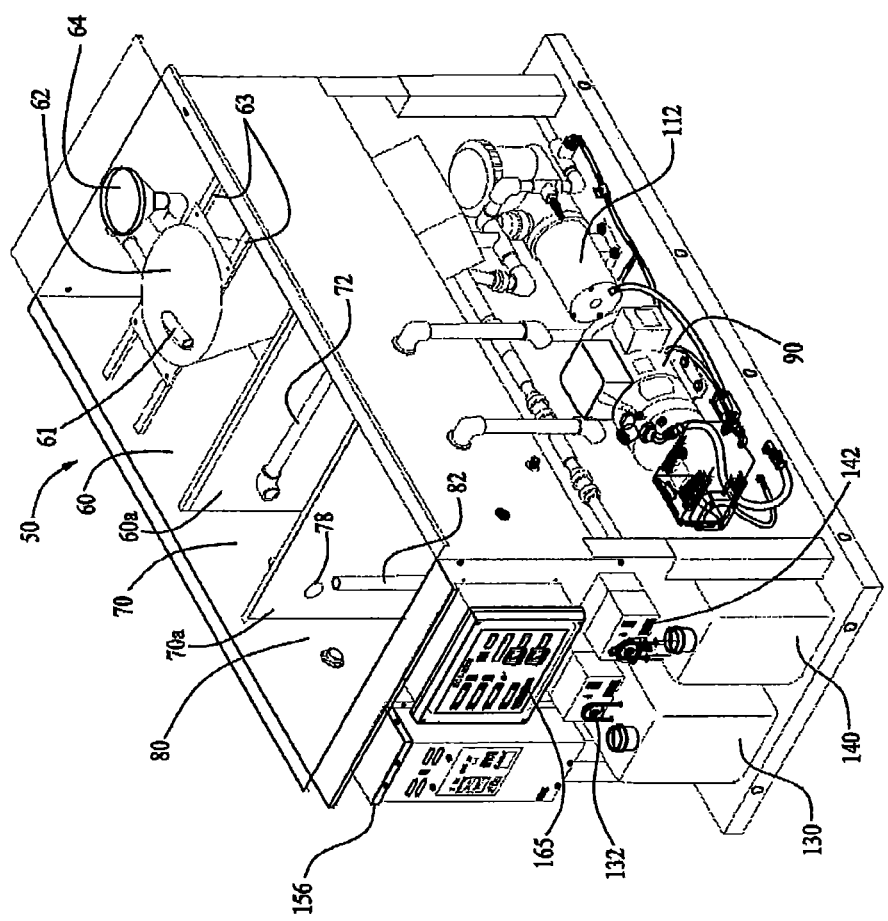
FIG. 4 is a perspective view of the water treatment system of FIGS. 1-3 with certain panels removed to expose internal components.
Figure 5:
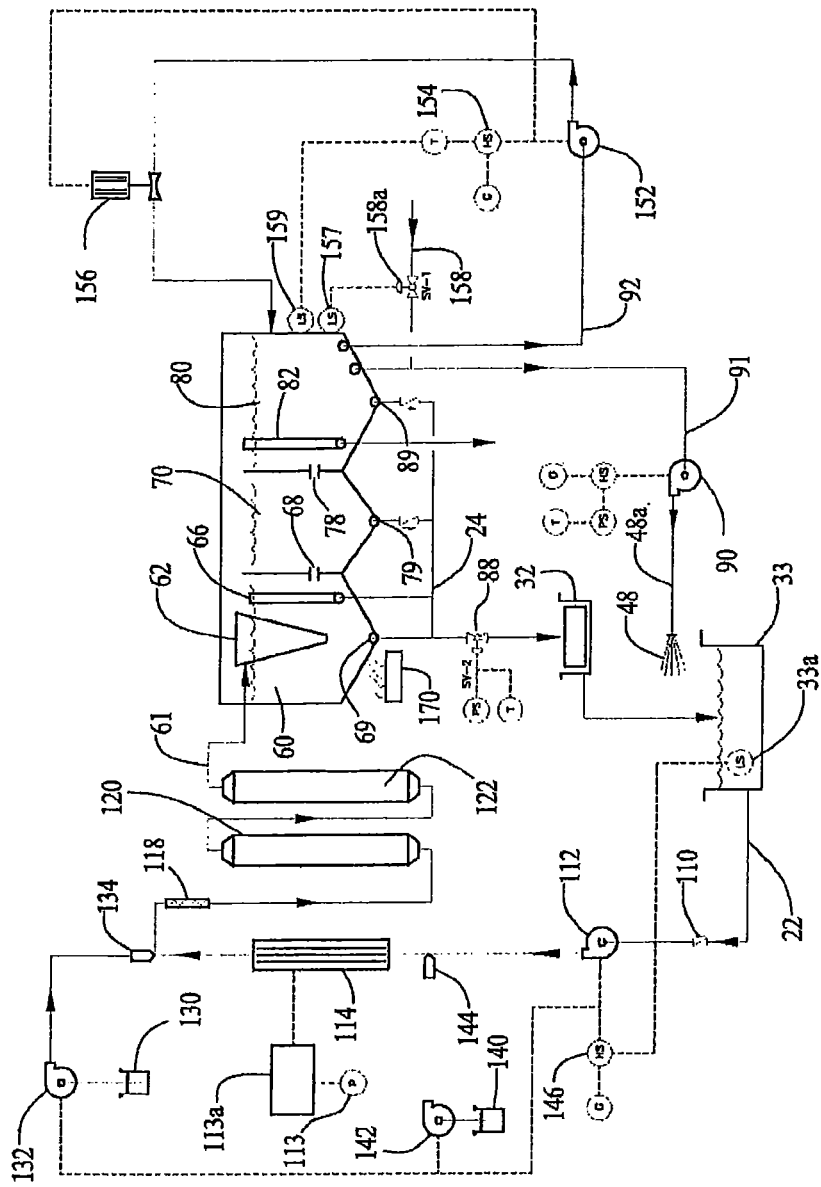
FIG. 5 is a schematic diagram of a preferred wash fluid treatment process for the wash fluid containment and water treatment system of FIG. 1.
Figure 6:
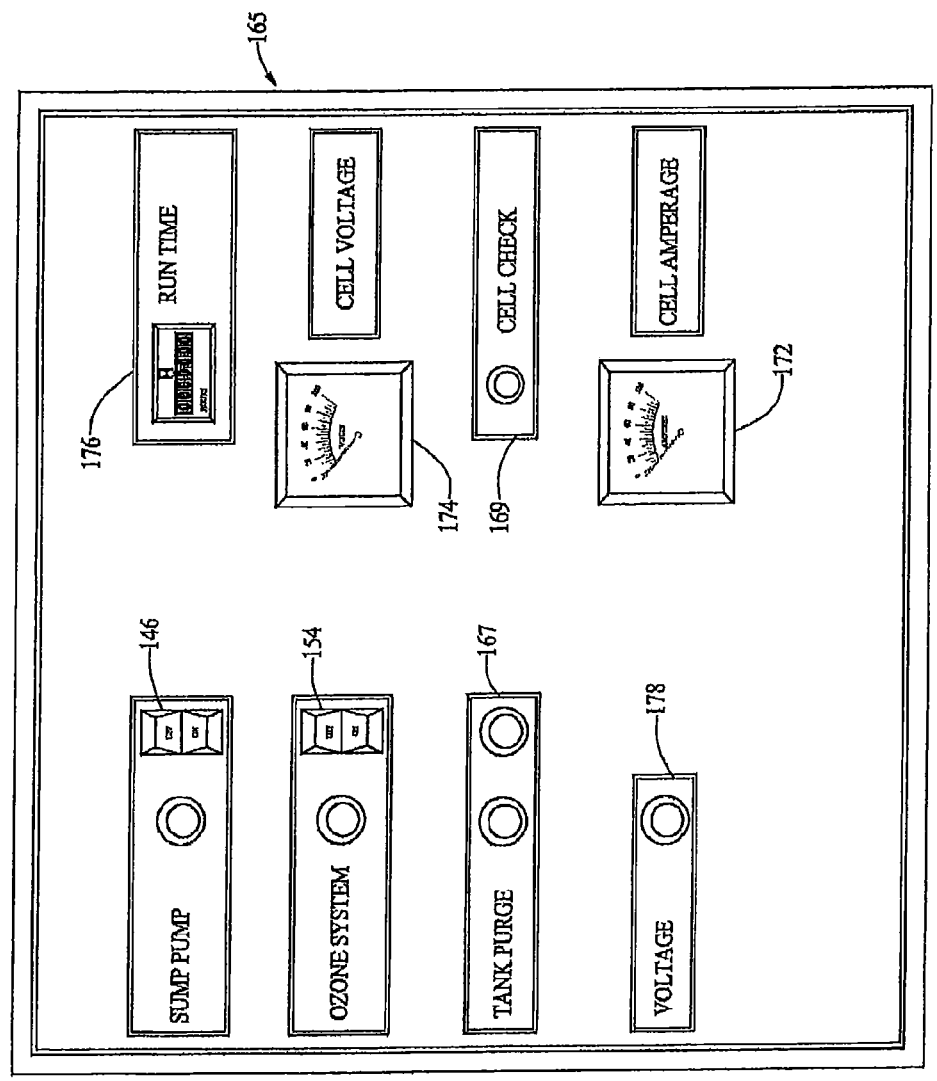
FIG. 6 is a front elevation view of the control panel of the water treatment system of FIG. 1.

Details of the water treatment process will now be described with particular reference to the perspective view of the water treatment system of FIG. 4, the schematic diagram of FIG. 5, and the process diagram of FIG. 2. Wastewater in the holding tank 33 is pumped via pump 112 into the treatment system via piping 22. A level switch 33a is disposed within the holding tank 33 providing a signal to a controller pertaining to the water level within the holding tank 33. Operation of the sump pump 112 is controlled by a switch 146. The switch 146 is manually actuated between the ON and OFF positions, the switch is in the ON position during normal operation, with a controller controlling the operation of the sump pump 112 depending upon the output of level sensor 33a in the sump tank 33. Upstream of the pump 112 is disposed an in-line internal strainer, acting much like a pool filter for protecting the pump 112 by preventing large particles from entering the pump inlet. In operation, while the sump pump 112 is pumping water from the holding tank 33 to the electrolytic cell 114, a metering pump 142 injects a conductivity solution from vessel 140 via injector 144. Backflow of fluids toward the holding tank 33 is prevented by a one-way check valve 110 disposed in the piping 22 upstream of injection point of injector 144. The conductivity fluid is preferably comprised of essentially a salt brine, which is designed to assist in the electrolytic process at the electrolytic cells 114. A suitable conductivity solution is made by mixing a salt in water.

The electrolytic cell 114 is powered by power supply 113a passing a current across the cells resulting in flocculation and coagulation in the waste water. A suitable electrolytic cell 114 is constructed of multiple individual cell plates. The conductivity metering pump 142 is controlled by an on-off switch providing a desired amount of conductivity fluid to the system and in response to a sensor control. The current flow provided by the power supply 113 a to the electrolytic cell 114 may be manually controlled or automatically controlled to provide electrical current to the water stream at the electrolytic cell 114.

After passing through the electrolytic cell 114, the wastewater enters a mixer 118 which is preferably one or more in-line static mixers. A suitable static mixer is the series 50 mixer available for TAH Industries Inc., Robbinsville N.J. A second metering pump 132 injects a polymer solution from vessel 130 via injector 134 into the water line between the electrolytic cell 114 and the static mixer 118. In its preferred form, the polymer solution is an organic long-chain high molecular weight emulsion flocculent designed to enhance conglomeration, i.e., enlarge the impurity particles to facilitate removal of particles later in the process. One preferred polymer is the NALCLEAR 7763 polymer flocculent available from Nalco Chemical Products of Naperville, Ill. The actual polymer solution selected will depend upon various factors including the input flow and the expected system impurities being treated by the water treatment system. After passing through the in-line mixer 118, the wastewater is passed through retention tubes 120, 122. This portion of the treatment system is a continuous flow system and the retention tubes 120, 122 are intended to provide sufficient residency and development time (reaction time) for the electrocoagulation and polymer flocculation to operate on the wastewater.

Upon leaving the retention tube 122, the wastewater proceeds via piping 61 into the water tank having three water compartments 60, 70, 80 arranged in a side-by-side, consecutive arrangement disposed within the cabinet 52. Pipe 61 enters the first water compartment 60 and is directed into a swirling cone mixer 62, the cone mixer 62 is a cone-shaped sub-compartment preferable disposed in the first water compartment 60 (for space efficiency reasons but could be located elsewhere). Wastewater entering via the pipe 61 is directed in a centrifugal motion around the cone mixer 62 (due to the cone shape and the tangential inlet direction of the inlet stream from the pipe 61) to create a swirling motion for the water flow. Some of the flocculated material is heavier than the remaining water and passes downward out through the bottom opening of the cone 62 and to the bottom of the first stage water compartment 60. Flocculation material and certain oils that are lighter than the remaining wastewater float to the surface of the first water compartment 60, is removed via oil skimmer or funnel 64, and purged out via piping 66 for recirculation to the sludge separator 32. As shown in FIG. 4, the cone mixer 62 is supported by a bracket 63 between the side walls of the tank compartment 60.

Wastewater from the first water compartment 60 passes through an opening 68 in tank divider 60a and then passes laterally through pipe 72 into the second water compartment 70. The opening 78 is at a mid-level position within the tanks. Heavy particles pass to the bottom of the tank 60 and are purged out through opening 69 into purge pipe 24, while lighter particles floating to the top of the tank are purged out through funnel 64 and purge pipe 66. It is intended that the wastewater at the mid-level of the tank 60 passing through the opening 78 would have the fewest particles. The pipe 72 provides a tortuous path for the "cleaned" wastewater (cleaned wastewater meaning somewhat cleaner wastewater due to the removal of certain particulates, etc. in the first water compartment 60) exiting the first water compartment 60 and entering the second water compartment 70 for further enhancing particle removal. Once in the second water compartment 70, the wastewater is provided with a relatively long residency time to allow for heavier particles and flocculation to settle down into the bottom of the compartment and be purged out of opening 79 into the recycle line 24. Exit pipe 74 is also positioned at mid-level within the tank compartment 70 and has an opening at an opposite side of the tank 70 from the inlet of the pipe 72. Thus the "cleaned" wastewater enters the tank 70 at one lateral side but must exit at the other lateral side. Similar to pipe 72, the pipe 74 provides a tortuous path for the water to pass from compartment 70 out through opening 78 and into the third tank compartment 80. Any heavy particles or heavy flocculation is purged out through the bottom opening 89 of tank 80 into recycle line 24. The flow of sludge water through recycle line 24 (which is connected to opening 89) is controlled by a control valve 88 and passed to the holding tank 32 and the sludge separator 30. One-way check valves are provided below opening 79 and 89 to prevent backflow of sludge water back into the tank 60, 70, and 80.

The cleaned wastewater within the third water compartment 80 is recirculated out from the tank via line 92 by pump 152 and through an ozone generator 156, thereby neutralizing bacteria within the water. The ozone pump 152 is controlled via manual switch 154 as permitted by level switch 159 on the tank compartment 80. As those in the art would appreciate, the generator 156 could be replaced with a generator of a suitable oxidizing agent generator device.

At the conclusion of these steps, the water within the tank compartment 80 is recyclable clean water and is pumped out by pump 90 via line 91 for reuse by pressure washer 48. According to one alternative embodiment, the recyclable clean water may be pumped to another location, such as a storm sewer, a potable water supply, a watering system, a holding tank or even back to the treatment system. Since there may be some water loss within the system, a fresh water line 158 is controlled by control valve 158a and level switch 157 allows additional water to be injected into the tank compartment 80. Fresh water line 158 may also serve to introduce fresh water to purge the system as necessary, or to mix recycled clean water and fresh water for further application.

As shown in FIGS. 1-6, there are various points throughout the process for collecting fluids in varying degrees of "cleanliness" for recirculating to other processes or for immediate reuse. For example, each compartment includes a drain 69, 79, 89 for separating the wastewater from the treated water, whereby the wastewater is distributed via recycle line 24 to the separation system or sump 30. However, pumping means may be provided to recirculate the wastewater produced by the treatment system 50 immediately to the wash pad 40, or back to the inlet of the treatment system 50. As yet another example, pumping means may be provided similar to pump 90 for distributing water collected by the system for reuse as a washwater supply to pressure washer 48.

Alternatively, water, including both recycled water and wastewater, that is produced and collected by the system in its varying embodiments may further be distributed to one or more of the following: storm sewer systems, potable water supplies, wastewater storage systems, greywater storage systems, irrigation systems, washwater applications (other than those described herein), natural water supply sources such as streams or rivers, and a variety of other suitable uses for clean water and waste water.

Pumping means may be comprised of a number of different types of apparatus for distributing water throughout the system to permit continuous and immediate treatment and/or reuse of fluids collected by the system. By way of example but not limitation, pumping means may include small frame fluid pumps, medium frame fluid pumps, large frame fluid pumps, peristaltic pumps, reversible flow pumps, siphons such as gravity siphons, and sump pumps. Other pumping means are also contemplated for use with the present system and method.

Referring again to FIGS. 1-6, a space heater 170, preferably controlled by a thermostat, is provided within the cabinet structure to provide a desired internal temperature in cold weather climates and/or other operating conditions. The treatment system 50 is provided with a control panel 165 located behind the doors 53a, 53b. Control panel 165 includes various controllers and gauges for the system, including the sump pump switch 146, the ozone system switch 154, the tank purge switch 167, and the electrolytic cell check light 169. When the sump pump 112 is running, the amperage gauge 172 will normally have an expected reading. For example, the operator may make the necessary adjustments on the amperage potentiometer 113 to provide desired amperage reading on the gauge 172 corresponding to the electrolytic cell 114. The control panel 165 also includes a cell voltage gauge 174 to visually monitor cell condition, a cell check light 169 to visually identify cell depletion, a voltage light 178 to show that electrical is connected, and a run-time meter 176 to indicate hours of run time for electric cell. The pressure washer is preferably provided with a time-delay shutdown mechanism that turns off the pressure washer if too much time has elapsed since the trigger gun was activated, such as when the operator walks away without turning it off.

Figure 7:
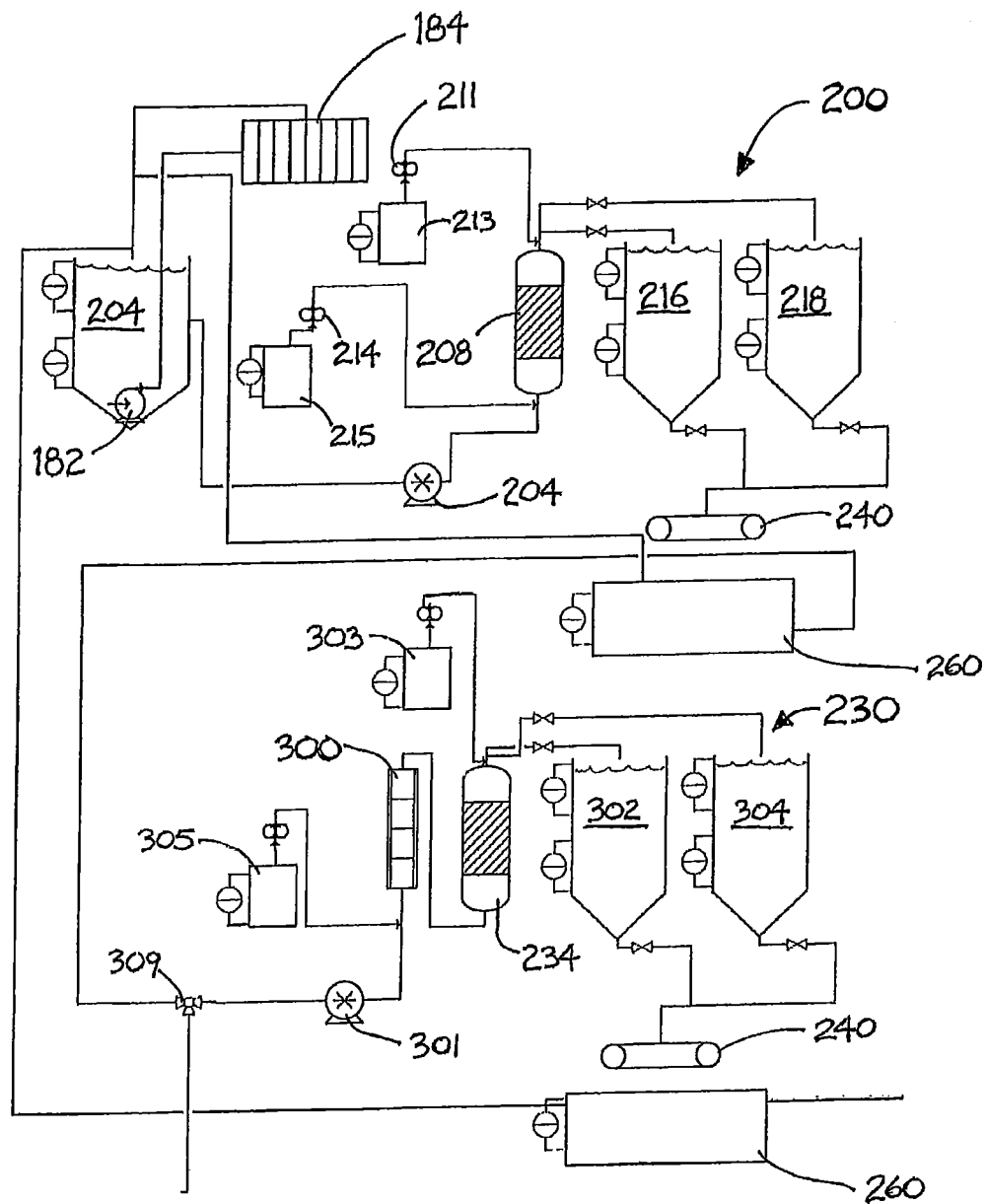
FIG. 7 is a process diagram of a wash fluid containment and water treatment system according to one alternate embodiment.

Referring now to FIG. 7, a further washwater or wastewater treatment system according to an alternate embodiment is shown. The system of FIG. 7 is designed to collect/contain solids and/or wastewater, and provide at least one process for recirculating and/or recycling water in an existing washwater application. In yet a further alternative embodiment, the recirculated and/or recycled water is distributed to another application, or to a sewer. Based on the type of wastewater, a selection of components is made possible for incorporating in the system of FIG. 7. There are various components that may be supplied to create the optimum washwater treatment system, including, by way of example but not limitation, a pit system, a coagulation system, an electrolytic cell system, a belt filter system, and a recycle system. Each is described in greater detail below.

The system shown in FIG. 7 comprises a series of tanks, valves, pumps, and other apparatus designed to circulate and treat fluids used by the system. According to a preferred embodiment, the system of FIG. 7 commences by collecting water in a pit or other vessel for collecting spent washwater from an upstream process, such as the wash pad described above in relation to FIG. 1-6. The pit preferably comprises at least one float, which is connected to a control system and indicates the washwater level within the pit. When water enters the pit, the float is triggered, sending a signal to the control system to start a pump preferably but not necessarily located in or near the pit for distributing water to downstream processes. Those processes are described in greater detail below. Similarly, once the pit is substantially drained by the pump, the float triggers the control system to turn off the pump. The cycle continues as subsequent wash cycles commence and additional washwater is collected by the pit.

If the application already has a pit system the existing pit will be used, but if it does not, then a pit system module 204 is preferably provided. The pit system module 204 has two preferred installation options. The first installation option assumes that the washwater application does not have a collection pit. In this instance the user would select the specially designed pit and install the pit below ground. The initial part of the pit would keep all large solids ½" or larger from entering the waste stream. These larger solids would be removed from the wash bay manually by the operator of the equipment. All other solids and waste water would then enter the pit. The pit size is preferably minimized so that there is a minimum amount of water that would go untreated. The remaining solids would fall to the bottom of the pit.

In the example of a solids treatment application, the pit design is such that a single large pump 182 would be able to pump the solids out of the pit and into a solids separator 184. This solids separator 184 would then allow the solids to dry and water from the solids would return to the pit. In the example of wastewater treatment, the waste water would preferably be removed from the pit and sent to the first water treatment stage, such as a chemical coagulation or flocculation process as described in detail below. The object is to treat the water as soon as it enters the pit, minimizing the amount and time the water is in the pit. Obviously, the pit could easily accommodate a holding tank or tanks.

Figure 8:
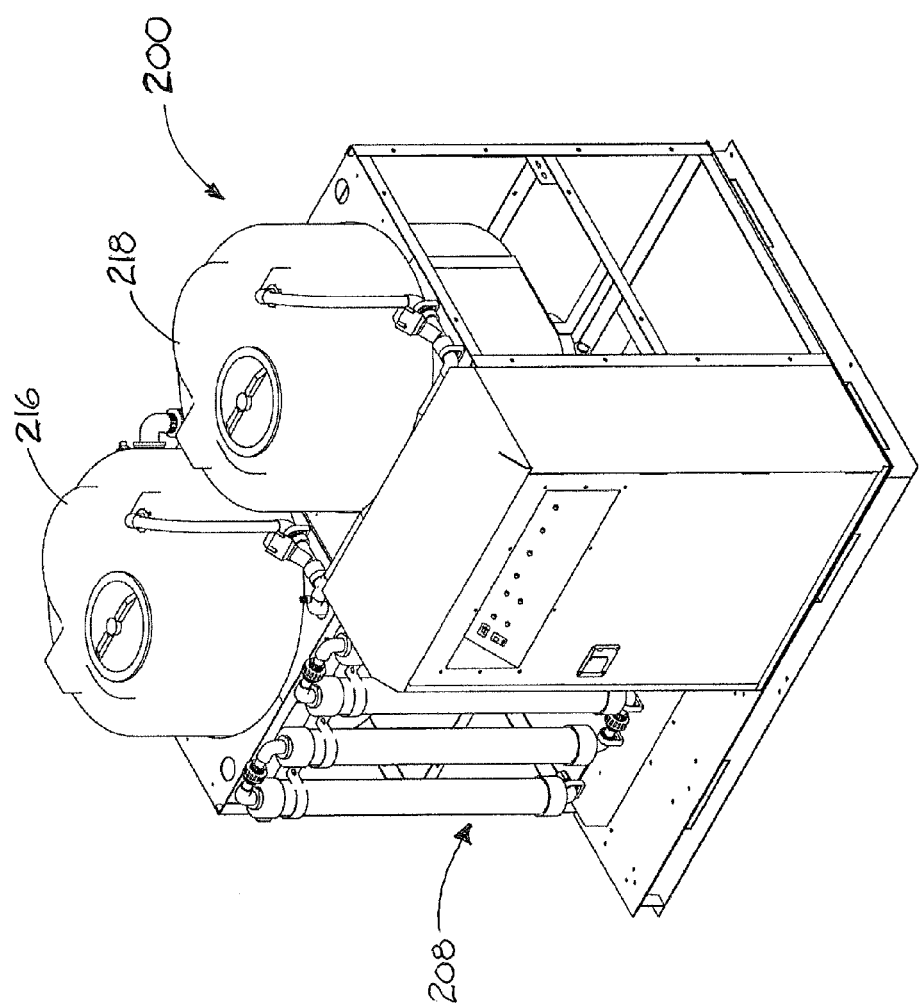
FIG. 8 is a perspective view of the coagulation module and mixing chambers from the process diagram of FIG. 7.

Yet another module of a preferred embodiment uses chemical coagulation and/or flocculation to break the bond of the suspended solids, as shown in detail by reference to FIG. 8. The coagulation module 200 detects the water level of the upstream process and begins to process the water. It is pumped from the upstream pump 204 and is injected with a coagulant. The waste water and coagulant are then passed through mixing chambers 208. These mixing chambers 208 are sized such that the flow of water is slowed down to allow for adequate mixing prior to being injected with polymer. As they pass through the mixing chambers 208 the coagulant separates the solids from the wastewater. Once they have passed through the mixing chamber 208, a polymer is added to the water by way of a pump 211 to supply the polymer solution from a holding vessel 213. The polymer is designed to enlarge the solids or impurities to help facilitate their removal in a downstream process. According to a preferred embodiment, the flow of polymer solution is controlled by a flow switch, which turns a peristaltic pump on when fluid flow to the mixing chambers 208 is detected. A coagulant may also be introduced by means of a peristaltic pump 214 and a coagulant vessel 215. Both the coagulant and the polymer may vary based on the waste stream. Floats may further be provided for determining the level of polymer solution and coagulant in vessels 213, 215.

Figure 9:
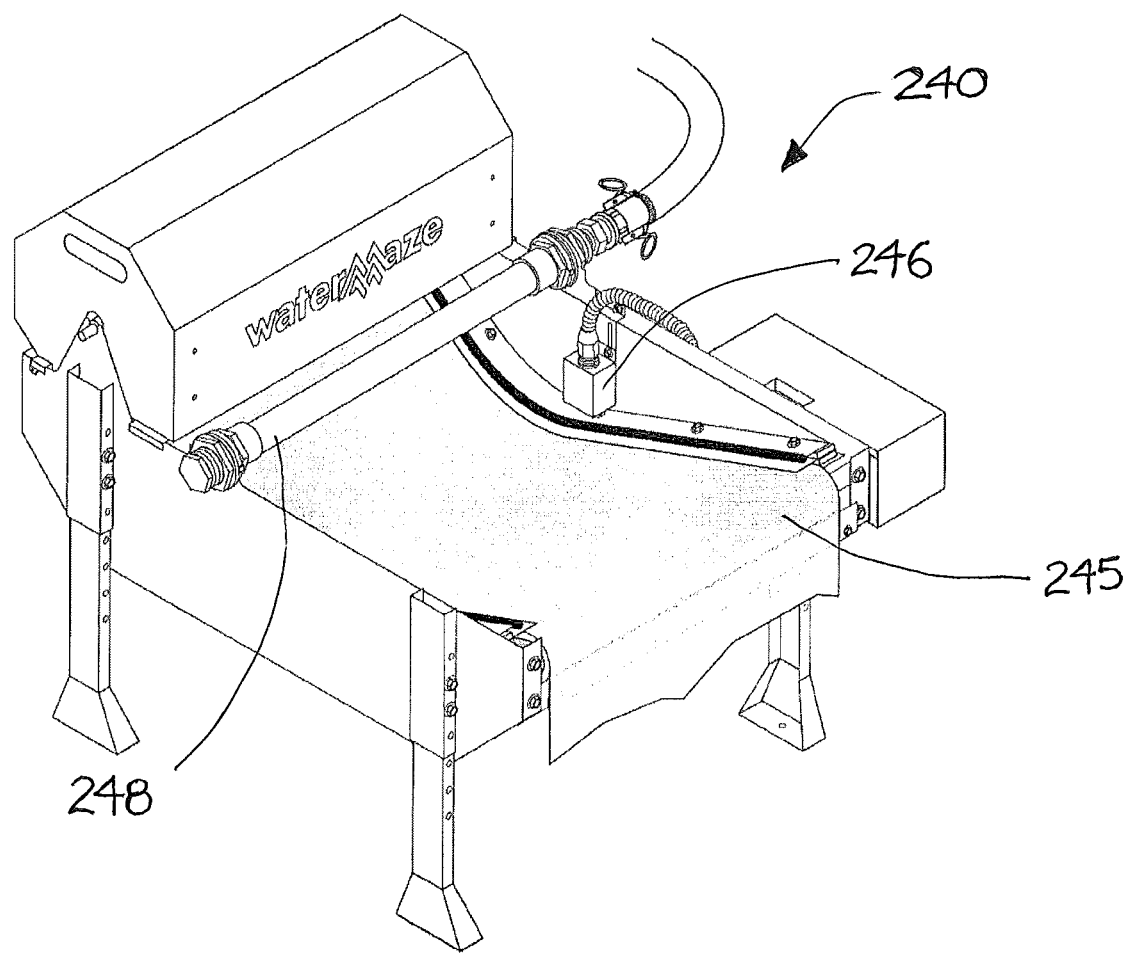
FIG. 9 is a perspective view of the belt filter from the process diagram of FIG. 7.

The system according to the embodiment described in relation to FIG. 7 comprises at least two tanks 216, 218 to allow for continuous processing. The wastewater with the flocculants will enter two timing tanks. These timing tanks 216 and 218 are designed to allow the impurities to grow in size prior to filtration. While one tank 216 is purging/dwelling the other tank 218 would be filling, or vise versa. At no time should there be water in the tanks for any long period of time. The process of FIG. 7 does not allow water to sit and/or stagnate within the wash pad or tanks, and further reduces the size of the footprint required for the tanks 216, 218 and overall device. After a short dwell time, the tank (216 and/or 218) is then dumped through filter media 240, therefore removing the impurities. A belt filter 240 (shown in detail by reference to FIG. 9) may be used to separate the solids from the wastewater. In a preferred embodiment, the belt filter 240 uses a predetermined micron filter paper on a roll. The paper is fed on a conveyor system and allows the water to pass through. As the water and solids enter the top tank area it is dispersed by a manifold 248. The solids collect on the filter paper 245 and the water passes through the paper filter 245. As the filter paper clogs or becomes used the water level will rise in the top tank and activate a float 246 to index the paper, providing clean filter area for the water to pass through.

Figure 12:
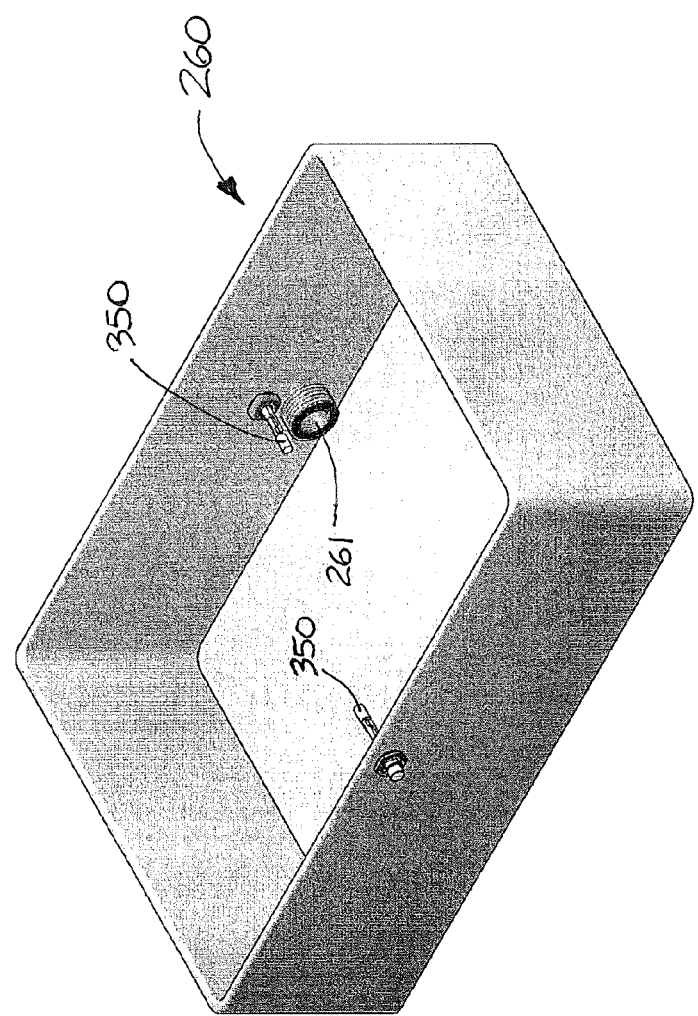
FIG. 12 is a perspective view of the sump area from the process diagram of FIG. 7.

The used filter with the solids is preferably moved off the conveyor and into a drying tub. This tub holds the paper out of the water but allows the paper to dry and solids to dry for ease of disposal. The filtered/clean water then can enter a sump area 260 (shown in detail by reference to FIG. 12) that can be pumped or drained to another machine or process, or recirculated to various other processes disclosed herein. The belt filter 240 according in this embodiment does not have its own built in sump, allowing for multiple installation options. A separate sump may also be provided with the belt filter 240, which preferably is equipped with two floats 350 that will communicate with the downstream process and the upstream process and prevents the system from overflowing.

Figure 10:
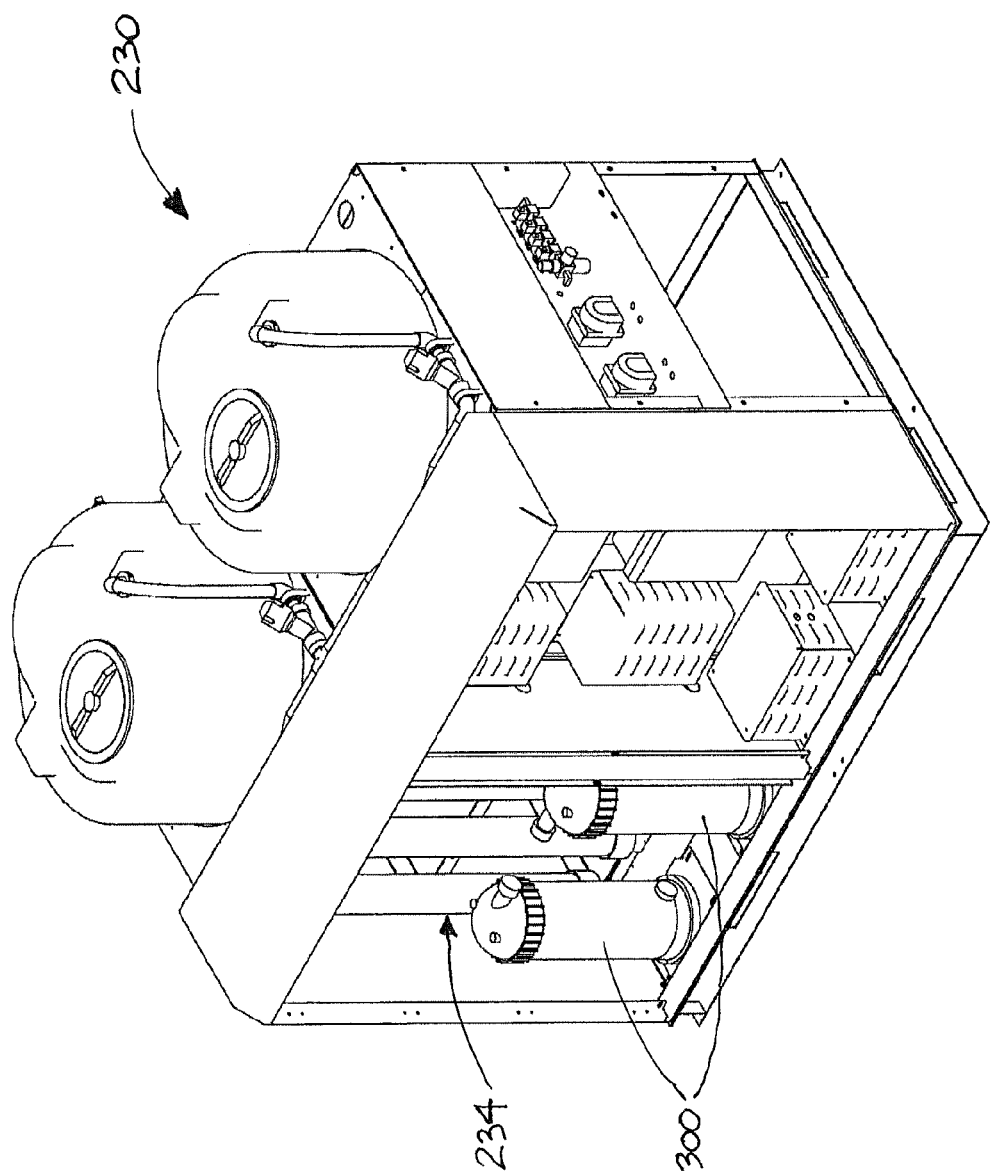
FIG. 10 is a perspective view of the electrolytic cell module from the process diagram of FIG. 7.
Figure 11:
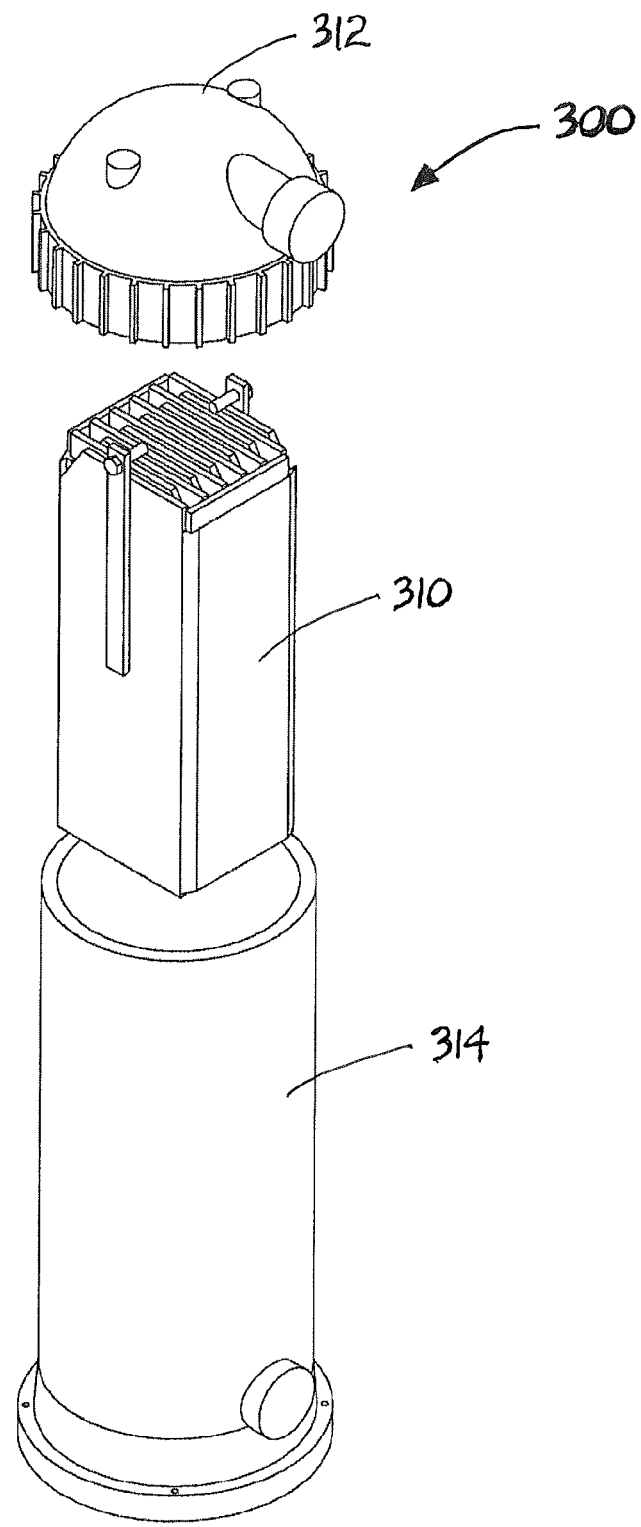
FIG. 11 is a perspective view of a cell assembly from the electrolytic cell module of FIG. 10.

Yet another module, known as the "EC" module 230 uses electrolytic cells to coagulate and flocculate, and is shown in greater detail in FIG. 10. The EC module 230 detects the water level of the upstream process and begins to process the water. It is pumped from the upstream pump 301 and is injected with a brine solution to help conductivity, preferably from a brine vessel 305 and peristaltic pump similar to the coagulant system described above in relation to coagulation module 200. It then passes through the electrolytic cell assembly 300, which is depicted in FIG. 11. The cell passes a current from one cell to another therefore beginning the separation of solids from the water molecules. The cell design is such that the EC cell 310 can be removed from the EC cell canister 314 by removing the EC cell lid 312 allowing for better cleaning and longer life of the cell. The water then passes through the mixing tubes 234 and once through the mixing tubes a polymer is preferably added to the waste stream. Similar to the coagulation module 200, the polymer solution is circulated by a peristaltic pump from a vessel 303 for holding the polymer solution. The polymer is designed to enlarge the solids or impurities to help facilitate their removal in a downstream process.

The system according to the embodiment described in relation to FIG. 7 comprises at least two tanks 302, 304 that allow for continuous processing. While one tank 302 is purging/dwelling the other tank 304 would be filling, or vise versa. At no time should there be water in the tanks for any long period of time. The process of FIG. 7 does not allow water to sit and/or stagnate within the wash pad or tanks, and further reduces the size of the footprint required for the tanks 302, 304 and overall device.

As before with the coagulation module 200, a second belt filter 240 may be used with the EC module 230 to separate the solids from the wastewater. In a preferred embodiment, the belt filter 240 uses a predetermined micron filter paper on a roll. The paper is fed on a conveyor system and allows the water to pass through. As the water and solids enter the top tank area it is dispersed by a manifold 248 (as shown in relation to FIG. 9). The solids collect on the filter paper and the water passes through the paper filter. As the filter paper clogs or becomes used the water level will rise in the top tank and activate a float 246 to index the paper and providing clean filter area for the water to pass through.

The used filter with the solids is preferably moved off the conveyor and into a drying tub. This tub holds the paper out of the water but allows the paper to dry and solids to dry for ease of disposal. The filtered/clean water then can enter a sump area 260 that can be pumped to another machine or process, or recirculated to various other processes disclosed herein. The belt filter 240 according in this embodiment does not have its own built in sump allowing for multiple installation options. A separate sump may also be provided with the belt filter 240, which preferably is equipped with two floats that will communicate with the downstream process and the upstream process and prevents the system from overflowing.

Figure 13:
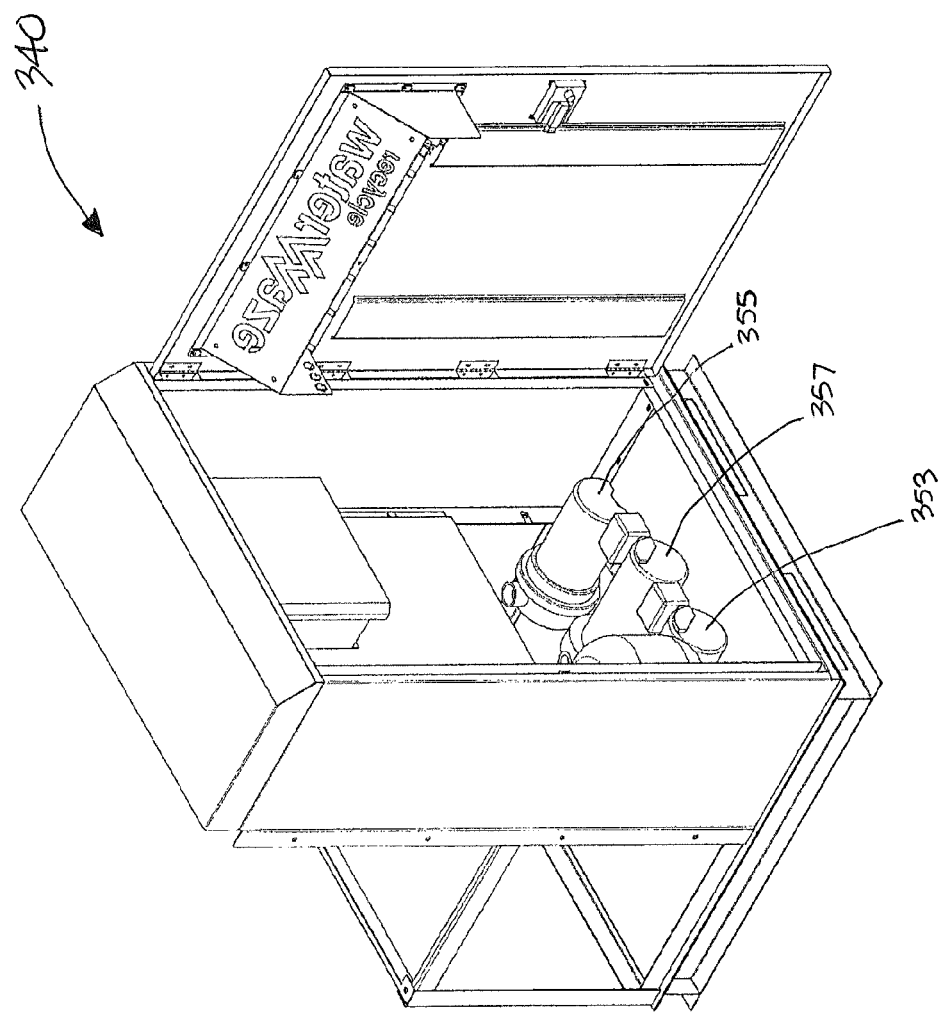
FIG. 13 is a recycle system according to yet another alternate embodiment.

A recycle system may also be provided (FIG. 13), which serves as the location and means for storing clean or treated water. The upstream processes push the clean/treated water to the recycle holding tank provided by the end user. Provided with the recycle system 340 are systems that prevent the water from going bad, including but not limited to fresh water makeup, rain water overflow and controls and one or more transfer pumps 353 from waste treatment or to a pressure washer as described above in relation to FIGS. 1-6. The recycle system preferably comprises at least one in feed pump 355 and at least one recycle pump 357 for bringing in and recycling the fluid in the recycling system 340.

A back flush valve 309 may also be provided in connection with the system of FIG. 7 for flushing the system or introducing fresh water as necessary to control the various processes described above. The valve 309 is designed to be in fluid communication with pump 301 for introducing fresh water to the EC module 230 and ultimately to the other systems via the recycle system 340.

This system includes various floats and controls to allow for smooth interface with all treatment and cleaning systems. A programmable logic controller or other logic control means may be incorporated with the system of the present disclosure for automatically controlling one or more of the processes or methods described herein. The use of pumping means to immediately and continuously treat and/or recirculate fluids captured by the system allows the objects of the disclosure described above to be accomplished, and to improve the efficiency of the system.

The foregoing description of the present disclosure has been presented for illustration and description purposes. However, the description is not intended to limit the invention to only the forms disclosed herein. In the foregoing Detailed Description for example, various features are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such a manner, or include other embodiments with various modifications as required by the particular application(s) or use(s) of the present invention. Thus, it is intended that the claims be construed to include alternative embodiments to the extent permitted by the prior art.

What is claimed is:

1. A self contained cleaning apparatus for continuously treating wastewater, comprising:
   at least one inlet for collecting fluids expelled by a cleaning device of the cleaning apparatus;
   wherein the at least one inlet for collecting fluids captures substantially the entire volume of fluids expelled by the cleaning device and continuously transfers these fluids from the inlet to a coagulation module for receiving and processing fluid captured by the at least one inlet, the coagulation module comprising a coagulant for injecting into the fluid, at least one mixing chamber for separating solids from the fluid, a pump for introducing a flow of a polymer solution to the fluid;
   at least two tanks for receiving and purging the fluid provided upstream of a belt filter for removing impurities from the fluid, wherein the at least two tanks allow for impurities in the fluid to increase in size prior to filtration;
   the belt filter comprising a float sensor for detecting a water level and indexing the belt filter; and
   means for storing treated fluid provided in operative communication with a transfer pump for recirculating the treated fluid to the cleaning device.

2. The apparatus of claim 1 wherein the cleaning apparatus includes; an electrolytic coagulation system comprising one or more electrolytic cells for treating the collected fluids.

3. The apparatus of claim 1 wherein the polymer solution is comprised of an organic long-chain high molecular weight emulsion flocculent.

4. The apparatus of claim 1, wherein the cleaning apparatus includes at least one pit system module for separating solid contaminants from the collected fluids.

5. The apparatus of claim 1 wherein the at least one inlet is comprised of a trough located in the flooring of a wash area assembly.

6. The apparatus of claim 1 wherein the pump is selected from the group consisting of a small frame pump, a medium frame fluid pump, a large frame fluid pump, a peristaltic pump, a reversible flow pump, a gravity siphon, and a sump pump.

7. The apparatus of claim 1 further comprising additional pumping devices for transferring fluid from the means for storing treated fluid to either the cleaning device or back to the coagulation module.

8. The self contained cleaning apparatus of claim 1, wherein two tanks are provided in operable communication with each other, such that when one tank is purging fluid, the second tank is receiving fluid.

* * * * *